Feb. 28, 1956
L. V. BLACK
2,736,140
APPARATUS FOR TREATING SHEET GLASS
Filed July 27, 1951
4 Sheets-Sheet 1
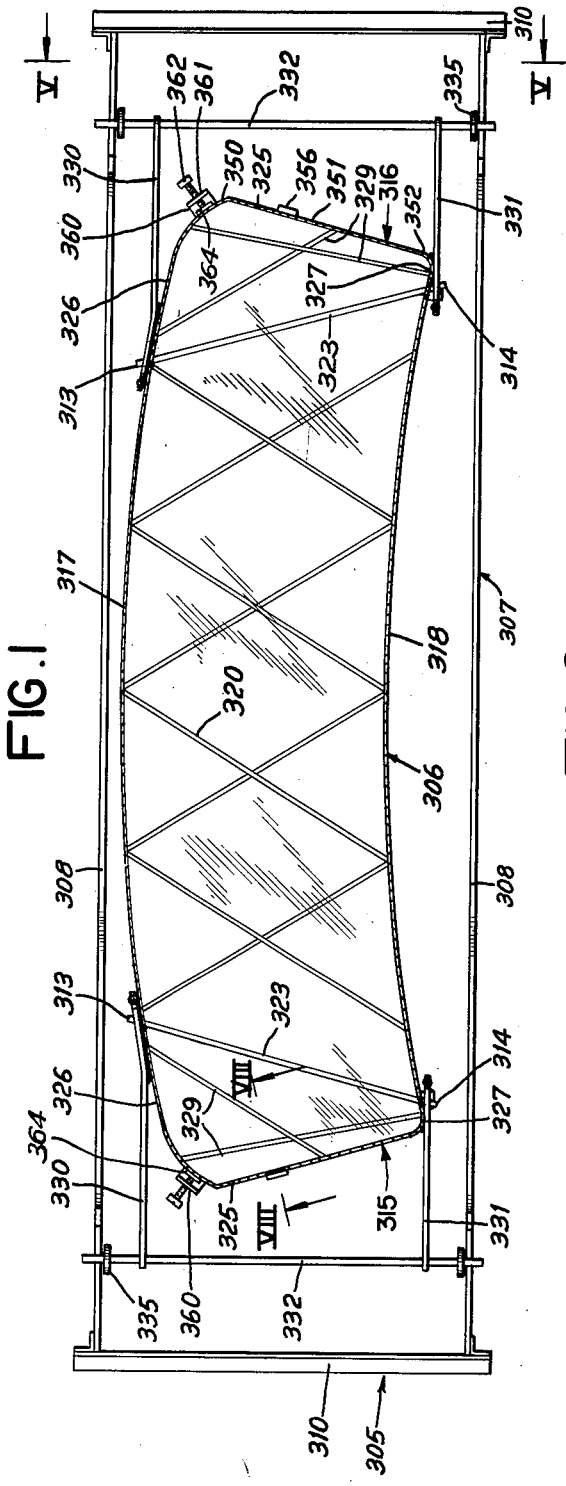
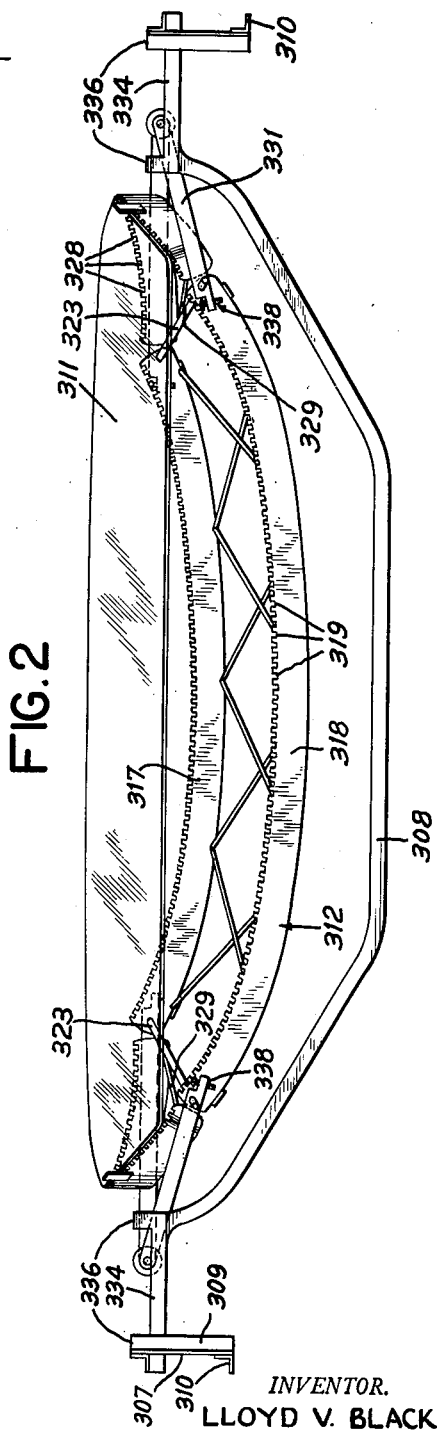
INVENTOR.
LLOYD V. BLACK
BY
Oscar L. Spencer
ATTORNEY.

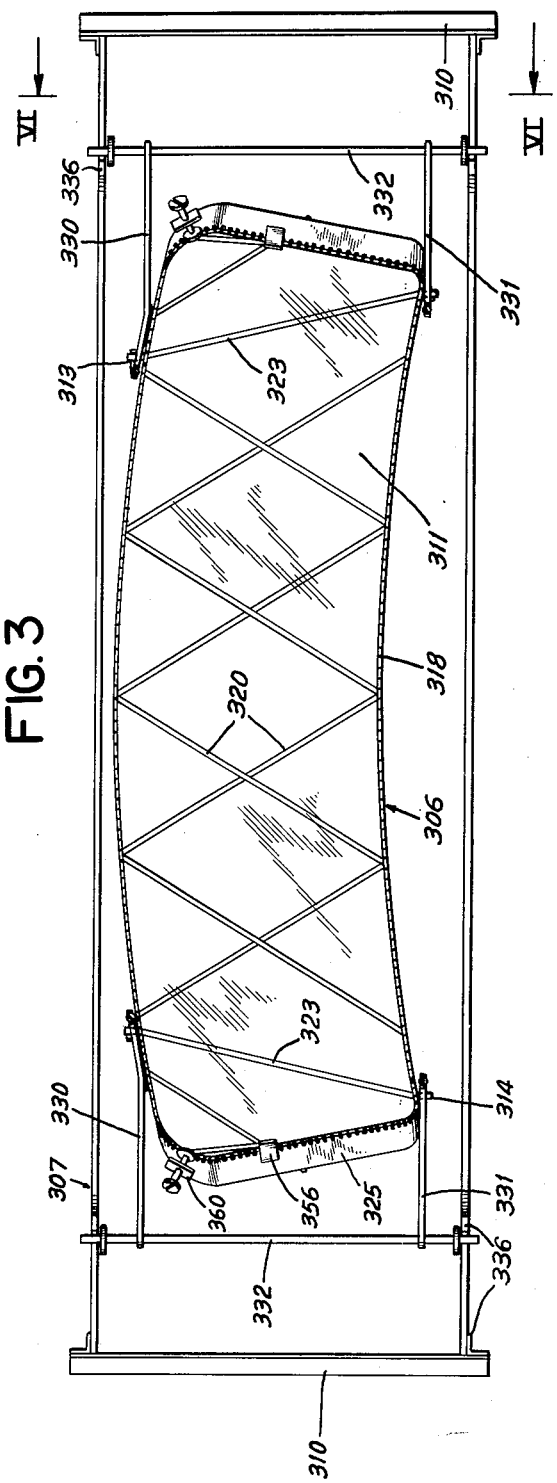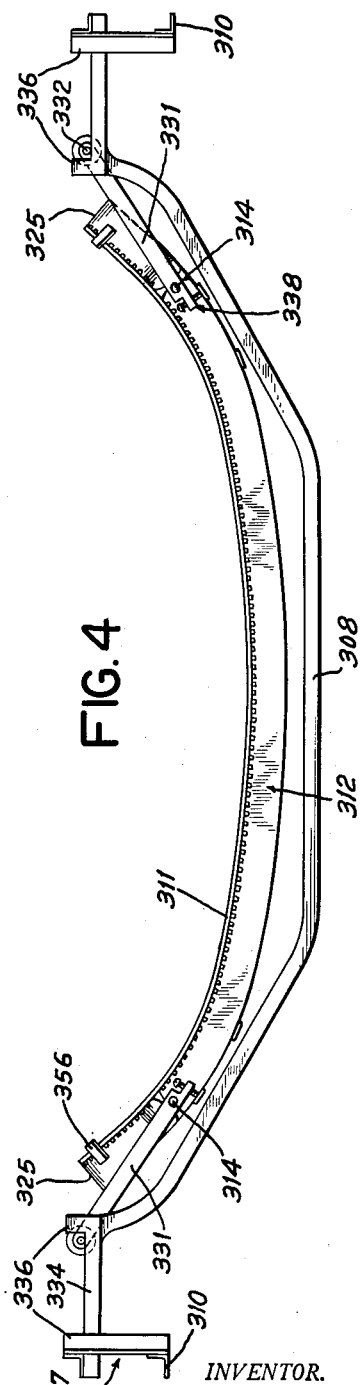

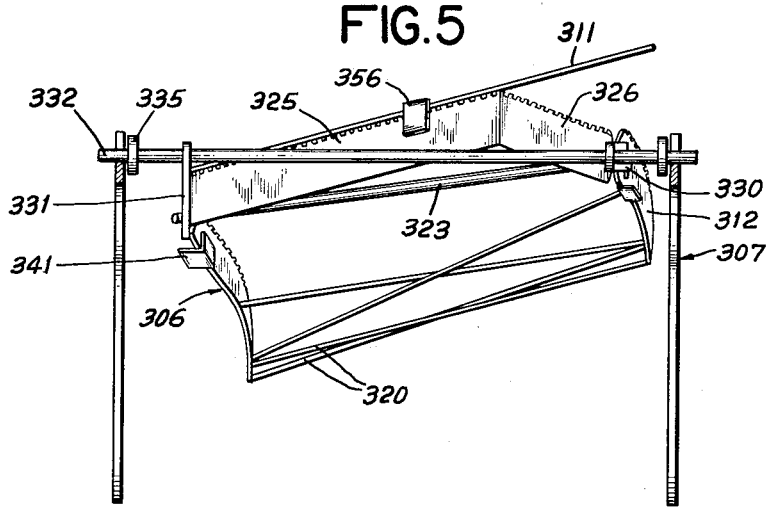
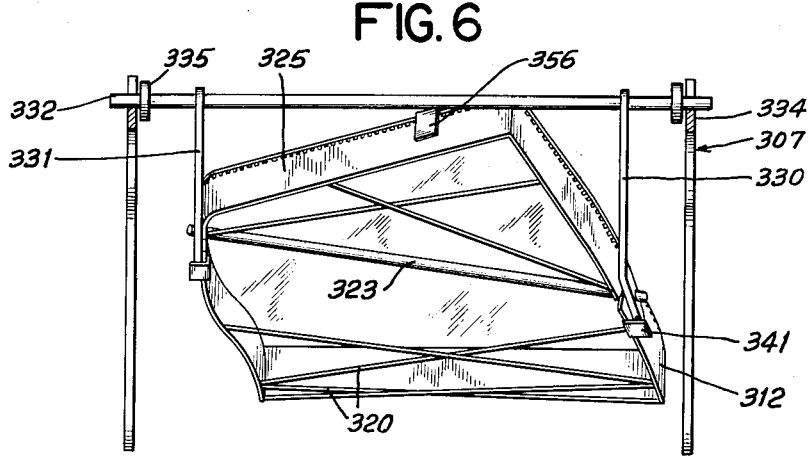
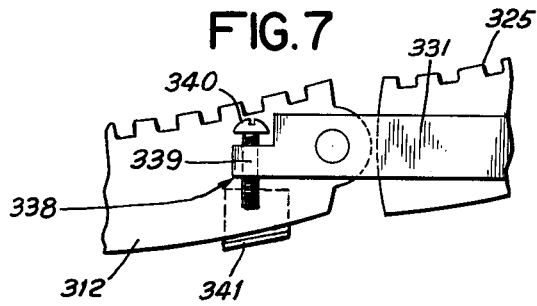
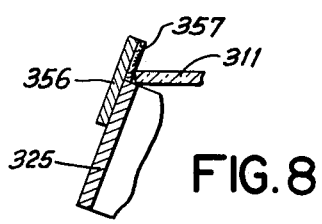

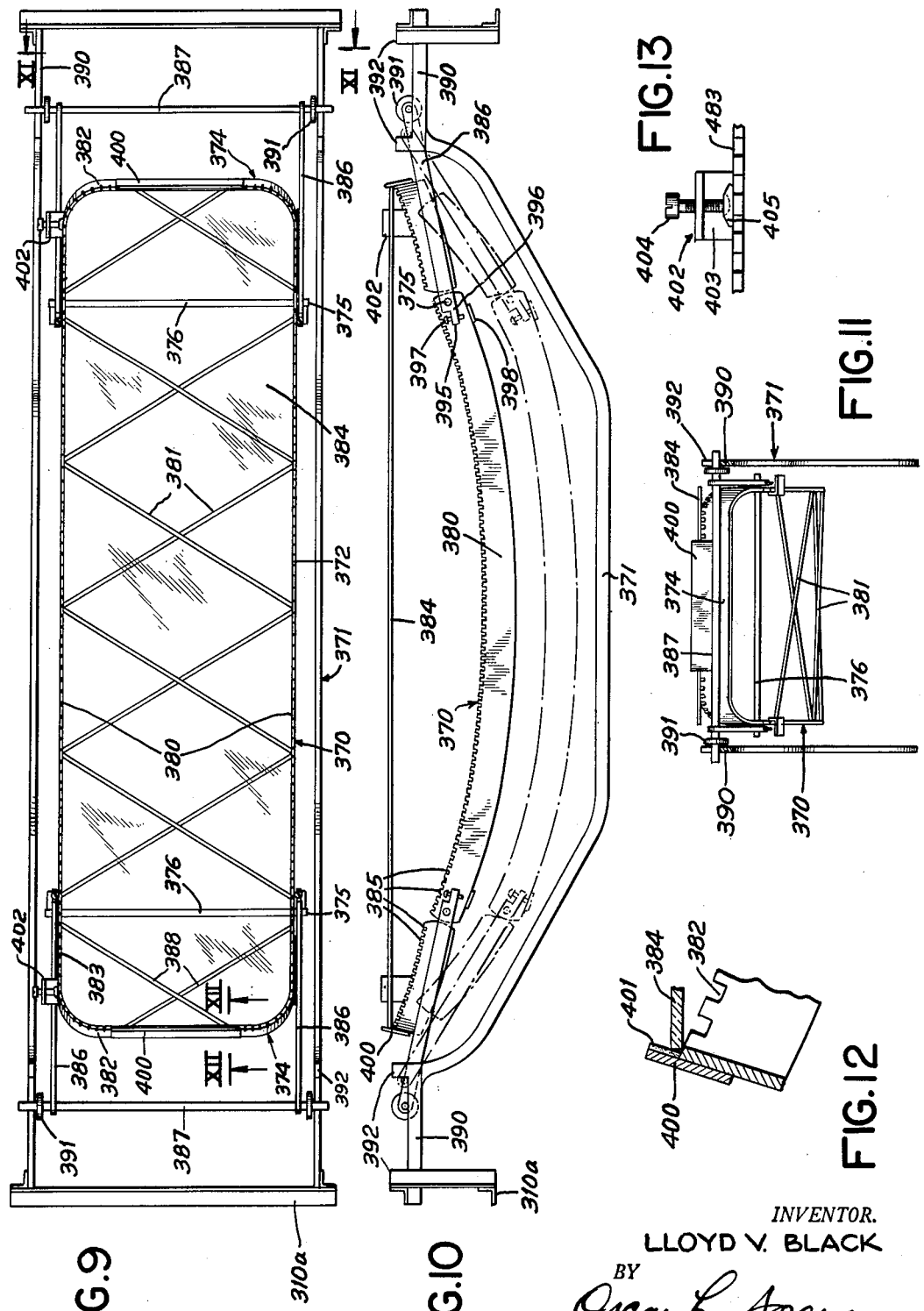

United States Patent Office 2,736,140
Patented Feb. 28, 1956

2,736,140

APPARATUS FOR TREATING SHEET GLASS

Lloyd V. Black, Tarentum, Pa., assignor to Pittsburgh Plate Glass Company, Allegheny County, Pa., a corporation of Pennsylvania Application July 27, 1951, Serial No. 238,943

8 Claims. (Cl. 49—67)

This invention relates to apparatus for bending sheet glass, and it has particular relation to the shaping of sheet glass into such forms as to be adapted for use in windows which are designed to receive sheet glass curved in conformity with streamlining or other curvatures of window structure in motor vehicles, aircraft, or in any structures in which such glass is applicable.

One object of the invention is to provide improved apparatus by which sheet glass units can be bent during the course of its transportation along a horizontal conveyor system, and wherein flat sheet glass can be bent from a substantially horizontal position partially under the influence of gravity and/or by other forces into the shape of a supporting mold.

Another object of the invention is to provide an improved structure of bending molds which is adapted to bend sheet glass into special forms, particularly to bend the sheet glass in several predetermined areas to relatively sharp curvatures.

In bending sheet glass wherein the end portions of glass units, such as those employed in motor vehicles, are to be bent along relatively sharp localized curvatures, difficulty has been experienced in devising molds and other apparatus suitable for producing such localized curvatures in the sheet glass units. Examples of such sharply bent glass units are found in vehicles in the form of rear windows, known as back lights, or in the form of windshields, and/or in other types of windows.

In connection with one of the features of the invention, so-called skeleton molds are so designed that each mold unit is included in a frame structure adapted to travel along a horizontal roll conveyor, the latter of which is so designed as to permit the intermediate portion of the mold to be disposed below the plane of the axes of the rolls of the conveyor. In this arrangement, the conveyor includes stub rolls adjacent opposite sides of the conveyor system and the end portions of each mold frame ride horizontally along these rolls which are driven by suitable power means.

Each mold frame with a sheet glass unit mounted thereon is transported into a furnace which is heated to proper temperature incidental to the softening of glass, for example, to approximately 1050° F. This furnace is equipped with facilities to apply localized heat at higher temperatures. Electric heating elements can be employed for this purpose so as to direct heat by radiation and in concentrated form to localized areas adjacent the end portions of the sheet glass unit where the sharper bending is to be effected. The concentrated and localized heat is applied at such value as to rapidly increase the temperature in selected areas of the glass unit from approximately 1050° F. to 1200° F. The glass is then immediately bent to the shape of the mold without producing an appreciable transverse curvature, either at the end portions or at the intermediate portions between the sharply bent portions. The concentrated and localized heat is applied only until the glass unit assumes the proper shape. Forces are applied to end portions of the sheet glass unit as a result of peculiarities in the structure and action of the glass supporting mold frame. These forces cooperate with the conveyor system and with the concentrated localized heat to accomplish optimum bending with proper proportions of heat and applied bending forces. The conveyor is operated immediately upon completion of the bending action to transport the glass to a position between upper and lower groups of air jet producing blowers so designed as to apply the air jets at approximately right angles to tangents to the glass curvature substantially at the points of impact of the jets against the glass surfaces.

The conveyor can be so designed and timed in its operation that each glass supporting mold can be transported between these groups of jet blowers at which time the conveyor rolls supporting the mold frame can be stopped for a measured time interval sufficiently long to permit application of chilling air jets upon the surfaces of the glass. The air jet producing unit oscillates upon eccentric mountings so as to describe a closed or endless path for each jet.

The glass supporting mold is held in proper position between the groups of oscillating jets until the glass becomes case hardened or tempered. Then the conveyor mechanism is operated to move the glass supporting mold forward a predetermined distance to bring it between groups of jet producing nozzles in a cooling unit which merely operates to reduce the temperature of the glass which still retains considerable heat although it had been reduced below the critical annealing temperature by the tempering apparatus. Two or more of these cooling units, which are stationary as distinguished from the oscillatable tempering units, can be disposed along the conveyor system at uniformly spaced intervals beyond the oscillating or tempering unit.

After the glass supporting molds reach the tempering unit the remainder of the conveyor system is operated step by step. For example, when one mold is moved to a position between the upper and lower tempering jets, the next mold which has just preceded it is moved to the first stationary cooling unit. Successive glass supporting molds are thus located at the same time between groups of jets of the oscillating unit, and between the groups of jets of the two stationary cooling units. Each sheet glass unit, therefore, is first subjected to a chilling or tempering treatment, and then to two treatments of cooling air from the two stationary jet producing units in connection with the successive steps of operation of the conveyor system. After the last cooling operation each glass supporting mold is removed or transferred to another conveyor and disposed of as desired.

In the drawing:

Fig. 1 is a plan of a frame structure including a cradle and mold frame supported thereon in extended position; Fig. 2 is a side elevation of the structure shown in Fig. 1; Fig. 3 is a plan view of a frame structure shown in Fig. 1 with a mold frame in its retracted position; Fig. 4 is a plan of the structure shown in Fig. 3, and including a glass sheet in its final bent form on the mold frame; Fig. 5 is an end view, partially in vertical section and partially in elevation, the section being taken substantially along the line V—V of Fig. 1; Fig. 6 is an end view similar to Fig. 5 including a vertical section taken substantially along the line VI—VI of Fig. 3; Fig. 7 is a fragmentary side elevation on a larger scale, of stop device structure to arrest pivotal movement among the sections of the mold frame; Fig. 8 is a vertical section on a larger scale taken substantially along the line VIII—VIII of Fig. 1 to illustrate pusher plate structure at the ends of the mold frame; Fig. 9 is a plan similar to Fig. 1 illustrating another form of frame structure; Fig. 10 is a side elevation of the structure shown in Fig. 9 and also including in broken lines a showing of a mold frame in the position it assumes after the glass sheet thereon has been bent to final form; Fig 11 is an end view, partially in vertical section and partially in elevation, of a mold frame, the section being taken substantially along the line XI—XI of Fig. 9; Fig. 12 is a fragmentary vertical section on a larger scale taken substantially along the line XII—XII of Fig. 9; and Fig. 13 is a fragmentary plan on a larger scale, illustrating gauging device structure.

The bending apparatus comprising the present invention includes a glass supporting frame unit 305. Each frame unit includes a sectional mold frame 306 adjustably and slidably supported upon cradle frame 307. Side bars 308 rigidly secured at their outer opposite ends by means of vertical and horizontal parallel angle iron frame members 309 and 310 form a rigid structure to support the mold frame 306. The lower parallel angle irons 310 are horizontally disposed upon the conveyor rolls 13 parallel to the direction of travel of articles transported by the conveyor and serve as runners along these rolls. Each mold frame 306, together with its cradle frame 307, is thus supported transversely of the conveyor system with the end portions of the cradle frames resting upon the stub rolls. The intermediate portions of the cradle frame and mold frame are suspended between and below the plane of the axes of the stub rolls.

In a practical application of the invention each mold frame carries a sheet glass unit 311 which is so mounted and supported upon the mold frame as to facilitate operations of bending and tempering to which such glass is to be subjected in connection with treatment thereof in the furnace.

The sectional elements of the mold frame include an intermediate section 312 having hinge connections 313 adjacent one side thereof and additional hinge connections 314 on the opposite side for pivotally joining such intermediate section to outwardly extending end sections 315 and 316. Side rails 317 and 318 of the intermediate section have upwardly facing curved edges which serve as molding areas of the mold frame. These edges can be serrated or notched, as indicated at 319. Relatively small diagonal rods 320 are rigidly secured, for example by welding at their opposite ends, to the rails 317 and 318 and thus a rigid grill-like intermediate section is provided. In this instance, the rail 317 constitutes the shorter side of the intermediate section and conversely the rail 318 constitutes the longer side of this section.

The mold frame as a unit is normally in a substantially horizontal position or approaches such position, although the relative positions of the mold parts can be varied to a considerable degree. As an example of a type of mold in which the end portions of the oblong glass sheet 311 are to be bent at much sharper curvatures than the intermediate portions, the hinge connections are arranged as shown in the drawings in such manner that the hinge connections 313 are located according to a particular relationship at opposite end portions of the shorter side of the rail 317, and the hinge sections 314 are located adjacent opposite end portions of the longer side rail 318 of the intermediate section. It is to be noted that the hinge connections 314 on the longer side rails 318 are in substantially a horizontal plane offset below the plane of the hinge sections 313 on the shorter side rail 317. It is also to be noted that the two opposite hinge connections 313 and 314 of each pair are not aligned directly across the mold frame but that the hinge connection 313 for the shorter side rail 317 is offset inwardly toward the central portion of the intermediate section 312 with respect to the hinge connection 314 of the longer side 318.

Two rods or bars 323 rigidly join the corresponding end portions of the side rails 317 and 318 and the ends of such rod locate the hinge connections, although the axes of pivoting are not coincident with the longitudinal axis of the rod. The rods 323 are disposed diagonally of the intermediate section and are in substantially converging relation from the ends of the longer side rail 318 toward the ends connecting the shorter side rail 317.

The end sections 315 and 316 comprise rails 325 which are somewhat irregularly U-shaped. One of the legs 326 of each U-shaped rail section has its end located adjacent the end of the shorter side rail 317 and constitutes substantially a continuation thereof. Likewise, the other leg 327 of each end section has its inner extremity located adjacent the longer side rail 318 and constitute substantially a continuation thereof. The leg 326 is longer than the leg 327 in each end section. The upper edge surfaces of the U-shaped rail 325 are curved according to the curvature to which end portions of the glass sheet are to be bent and are also serrated or notched, as indicated at 328. The overall curvature of the molding surface is concave. The combined upper edge surfaces of the several rails, 317, 318 and 325, constitute molding areas along which the glass sheet conforms in its final bent shape. Crossed bracing rods 329 are also rigidly secured at their outer ends to the rails 325 of the end sections.

Outwardly extending arms 330 and 331 of each end section are rigidly connected by welding or by other suitable means for rigid connection to the outer sides of the rail legs 326 and 327, respectively, of the end sections. These arms are also rigidly connected at their outer ends to transverse rods 332 which are disposed substantially horizontally. The arms 330 and 331 and the rods 332 constitute rigid portions of the end sections. The rods 332 are substantially parallel. However, the arms 330 are longer than the arms 331 and are in such relation as to cooperate properly with the arrangement of the shorter and longer side rails of the intermediate section 312.

Opposite end portions of the rods 332 are slidable upon horizontally disposed guides 334 which are formed as rigid parts of the cradle frame 307. These guides are arranged in pairs adjacent opposite end portions of the cradle frame. Stops 335 on the rods 332 prevent the mold frame from shifting laterally, and additional stops 336 on the guides 334 limit horizontal sliding movement of the rods within predetermined limits while permitting longitudinal shifting of the sectional mold with respect to its extending and retracting operations which are made possible by the sectional and hinging character thereof.

The hinge connections 313 and 314 are formed as parts of the extended opposite ends of the diagonal rods 323 although the axis of pivoting of each hinge connection is disposed at an angle to the major or longitudinal axis of the rod 323. Therefore, in establishing the hinge connections among the sections 312, 315, and 316, the inner ends of the arms 330 and 331 are pivotally supported on the outer ends of these rods 323 with the axis of pivoting in each instance disposed in the required angular relation.

In order to control the degree of pivotal movement among the sections 312, 315, and 316 individually adjustable stop devices 338 (Fig. 7) are mounted adjacent the several hinge connections. Each of these devices 338 includes a rigid flange or extension 339 rigid with the end section structure. These flanges or extensions 339 can be parts of the arms 330 and 331 and are tapped to receive screw bolts 340 threaded therethrough. Stop extensions or flanges 341 formed as rigid parts of the side rails of the intermediate section 312 are aligned in opposed relation to the ends of the several screw bolts 340. By manipulating the stop devices the sections of the mold frame can be precisely adjusted to present the proper curvature along the upper edges of the side rails and end rails to which the glass sheet is to be bent. The bolts 340 can be adjusted so that they individually strike the stop 341 at the same time to limit downward pivotal movement among the sections 312, 315, and 316.

In one phase of bending glass sheets which in final form are relatively sharply curved at their end portions, for example, glass sheets or plates which serve as windows for certain types of automobiles, the flat blank glass sheet to be bent is somewhat irregular in its shape, as distinguished from rectangular figures. Its end portions are diagonally cut and the corners rounded. The type of mold frame described herein is so designed as to be particularly applicable to bending such special shapes for windows of automotive vehicles.

It is to be noted that the end portions of the mold frame, that is, the outer extremities of the end sections, are formed with outwardly projecting portions 350 which can be termed corner portions although they are rounded. The adjacent rail portion 351 of each end section is curved only slightly and spans the distance between the corner portion 350 and a second corner portion 352, the latter of which is located adjacent the hinge connection 314. The corner portion 352 is also spaced farther inwardly toward the central portion of the mold frame. The rounded corner 352 is disposed at the outer end of the shorter extension or leg 327 of the rail 325, so as to be located in end to end relation to the adjacent longer side 318 of the intermediate section. The projection or rounded corner 350 is a continuation of the longer leg 326 which is aligned in end to end relation with the shorter side rail 317 of the intermediate section.

Each end portion of the mold frame in plan view therefore, presents a slightly curved and somewhat diagonal rail section between the rounded corners 350 and 352.

Relatively small plates 356 are rigidly mounted between the rounded corners 350 and 352 on each end section. These plates are faced with insulating material, for example, relatively small pieces of asbestos 357 in sheet form. Opposite end edges of the glass sheet 311 are confined between these plates 356 which serve as pushers during bending operations.

In order to place a glass sheet upon the mold frame, the sections are spread or extended lengthwise. This spreading or extension of the mold can be accomplished by applying a suitable tool, such as a bar, on one of the end rods 332 with the inner end of the bar disposed underneath the adjacent end section. The rod 332 serves as a fulcrum and the mold sections can thus be lifted and spread to the desired position. The horizontal rods 332 in such spreading action slide outwardly upon the guides 334 and the pusher plates 356 are moved away from each other a sufficient distance to receive the edges of glass sheet. Adjustable gauges 360 mounted upon the rails 325 of the end sections are adjustable toward and away from the edges of the glass sheet. Such gauges can be set according to the position the glass sheet is to assume in mounting it upon the mold frame and prevents the glass from shifting incidental to the initiation of the bending operation. Each of these gauges comprises a bracket 361 rigidly mounted upon the rail 325 of the end section and a screw bolt 362 which is threaded through the plate. The inner end of the screw bolt 362 has a small plate or disk 364 mounted thereon for slight pivotal movement in order that it may conform to the edge of the glass sheet when the latter is mounted upon the frame.

The hinge connections 313 and 314 are so arranged as described above that the area of each of the end sections between the curved corner portions 350 and 352 assumes a position slightly deviating from horizontal when the mold sections are spread or extended to receive the unbent glass sheet.

An alternate form of structure for a sectional mold frame 370 is carried in a cradle frame 371 which is substantially the same in arrangement as the cradle frame 307 and is provided with horizontal and parallel angle bars 310A which travel on the stub rolls in the same manner as the angle irons 310. The mold frame 370 includes an intermediate section 372 and end sections 374 extending from opposite extremities thereof.

Hinge connections 375 at opposite end portions of the intermediate section include the extremities of substantially parallel rods 376 which are rigidly secured to the opposite end portions of the intermediate section 372. The mold frame 370 is somewhat similar in structure and general arrangement to the structure previously described with the exception that a plan view (Fig. 9) of the mold frame 370 is substantially rectangular in appearance and the pivotal connections of the mold frame 370 are not offset or disposed at different elevations as is the case with reference to the structures shown in Figs. 1 to 8. Side rails 380 which are substantially parallel along opposite sides of the intermediate section 372 have upwardly facing edges to receive the marginal portions of a glass sheet in supporting it. Relatively small diagonal bracing rods 381 are rigidly secured, for example by welding at their opposite ends to the rails 380 and thus provide a rigid grill-like intermediate section. In this arrangement, the side rails 380 are substantially the same length.

The mold frame 370 as a unit is normally in a horizontal position or approaches such position, although the pivotal relationship among the mold parts can be varied to a considerable degree with regard to the angular movement of the sections about the hinge connections 375.

The end sections 374 comprise rails 382 which are substantially U-shaped. Inwardly extending legs 383 of the U-shaped rails are arranged in slightly spaced end-to-end relation to the side rails 380 and in effect constitute continuations thereof. The upper edges of these U-shaped rails are curved according to the curvature to which the end portions of a glass sheet 384 are to be bent. The overall curvature of the molding surfaces along the upper edges of the intermediate rails and end rails 383 is concave and the upper edges of these rails are serrated or notched, as indicated at 385.

Outwardly extending arms 386 of each end section are rigidly connected by welding or by other suitable rigidly securing means to the outer sides of the rail legs 383. These arms are also rigidly connected at their outer ends to transverse rods 387 which are disposed substantially horizontally. They are also parallel to each other. The arms 386 and the rods 387 constitute rigid portions of the end sections and these sections also include transverse bracing rods 388 rigidly secured thereto.

Opposite end portions of the rods 387 are slidable upon horizontally disposed guides 390 which are formed as rigid portions of the cradle frame 371. These guides are arranged in pairs adjacent opposite end portions of the cradle frame. Stops 391 in the form of plates or disks are mounted rigidly upon the rods 387 to prevent the mold frame from shifting laterally. Additional stops 392 on the upper sides of the guides 390 limit horizontal sliding movement of the rods within predetermined areas by permitting longitudinal shifting of the sectional mold frame 370 with respect to its extending and retracting operations which are made possible by the mounting and sectional hinging character thereof.

In order to control the degree of pivotal movement among the sections 372 and 374, individual stop devices 395 are installed in connection with the several hinge connections 375. Each of these stop devices includes a rigid flange or extension 396 rigid with the end section structure. These flanges or extensions 396 can be parts of the arms 386 and they are tapped to receive screw bolts 397 threaded therethrough. Stop extensions or flanges 398 formed as rigid parts of the end portions of the side rails 380 are aligned in opposed relation to the ends of the screw bolts 397. By manipulating the stop devices, the sections of the mold frame 370 can be precisely adjusted to present the proper curvature along the upper edges of the side rails and end rails to which the glass sheet is to be bent. The bolts 397 can be adjusted so that they individually strike the stops 398 at the same time to limit downward pivotal movement among the sections 372 and 374.

Relatively small plates 400 are rigidly mounted at the outer extremities of the end sections 374 in such position that the upper edges of the rails 382 on the inner sides of the plates are exposed to support the end portions of the glass sheet 384. These plates are faced on their inner sides with a cushioning layer 401 of heat resisting material such as asbestos. In order to place the glass sheet 384 upon the mold frame, the hinged sections 372 and 374 are spread or extended lengthwise. This manipulation can be accomplished by applying a suitable tool, such as a bar on one of the rods 387 with the inner end of the bar disposed underneath the adjacent end section. The rod 387 serves as a fulcrum and by forcing the outer end of the bar downward the sections can thus be spread to the desired position to receive the glass. The horizontal rods 387 in such spreading action slide outwardly and horizontally upon the guides 390 and the plates 400 are moved away from each other a sufficient distance to receive the end edges of the glass sheet. The intermediate portion of the sectional mold frame is raised during this operation of positioning the glass sheet thereon. The weight of the glass and the mold frame under the action of gravity exert considerable inward pressure upon the end portions of the glass as these sections tend to pivot to a lower position at which the bolts 397 engage the plates or stops 398.

Adjustable gauges 402 mounted upon the rails 382 are adjustable toward and away from the edges of the glass sheet so as to insure proper positioning of the glass above the rail preparatory to the bending operations. Each of these gauges includes a bracket plate 403 mounted rigidly upon the rail 382 of the end section to receive a screw bolt 404 which is threaded through the bracket plate. The inner end of the screw bolt has a small plate or disk 405 mounted thereon for slight pivotal movement in order that it may adapt itself evenly to the edge of the glass sheet when applied thereto. After the glass has been positioned as indicated, the mold frame together with the cradle frame is transported through heated zones of the furnace.

In reviewing the operation of the apparatus described above several of the frame units 305 are spaced along the length of a conveyor with each unit including a mold frame 306 having a sheet of glass mounted thereon. As the glass supporting unit proceeds along the conveyor the heat in a furnace through which the glass is carried raises the temperature in the glass sheet 311 to a value of approximately 1050° F. This temperature is such that the glass is almost ready to begin its initial bending and is being softened. Then the frame mold is moved to a position between upper and lower electric heating elements which are energized in such manner as to apply increased localized heat adjacent the extremities of the glass sheet and in the neighborhood of the hinge connections 313 and 314. The increased temperature in the glass in these localized areas permits the glass to bend downward partially under the influence of its own weight plus the forces applied to the ends of the glass unit by the weight of the mold frame as the sections thereof collapse downwardly until the stop devices 338 arrest the downward and pivotal movement of these sections. Concurrently with this movement the end portions on the guides slide inwardly. Considerable pressure is thus exerted upon opposite extremities of the glass sheet by the plates 356 thereby expediting the bending of the glass adjacent its end portions to conform to the sharper curvatures of the end portions of the mold frame.

Since the central portion of the glass unit has not been heated as rapidly as the end portions, the glass will not bend as quickly in this area along the central section of the mold frame whose curvature is much less sharp than the curvatures at the end portions thereof. In this manner the marginal portions of the glass sheet reach the upper edges of the molding surfaces of the central section 312 and end sections 315 and 316 at approximately the same time.

The central portion of the glass actually does not begin to bend appreciably until considerable bending has taken place in the end portions that flank the opposite extremities of the central portion. By regulating the bending forces and heat energy in the manner specified, transverse bending or sagging in the glass is reduced to a minimum. If the glass softening heat were applied uniformly over the entire area of the glass the bending would occur too early in the intermediate section and before the end sections could assume their sharply bent contour. Under such conditions the central portion of the glass would prematurely reach the upwardly facing molding edges of the side rails 317 and 318 and thereafter the bending would continue transversely of these rails until the completion of the sharp curvatures at the end portions of the glass. It is therefore important that the applied heat and the rates of bending be regulated differentially with reference to the central and end portions of the glass so as to insure substantially concurrent completion of the bending action throughout the areas of the glass. Likewise, these factors are so co-ordinated that the completion of this bending action occurs substantially at the time the stop devices 338 arrest the collapsing or pivoting action of the mold. There is not as much tendency of the glass to bend or sag transversely in the areas between the legs 326 and 327 of the end sections where the heat is concentrated, because the bending action occurs relatively rapidly in these locations and also because the bent end portions assume a relatively steep upwardly sloping position which lessens the tendency to sag.

As soon as the bending operation has been completed the frame unit with the glass sheet thereon is moved to a position between upper and lower jet tubes which are movable in closed patterns relative to the glass sheet. While the glass is still heated to softening temperature, the jet directing nozzles apply jets of air upon opposite sides of the glass sheet and during this application the nozzles move relative to the glass in the manner described above. At the curved end portions of the glass, it is to be noted that the nozzles are directed toward the curvature of the glass in such manner as to strike the glass surface substantially at right angles to tangents to the curvatures at points on the glass surface nearest the discharge of the individual nozzles. In this way the most advantageous tempering effect can be realized from the air jets.

After the tempering operation, the glass still retains considerable heat below annealing temperatures which can be dissipated in the operation of succeeding units. The temperature in the glass is thus reduced to a value sufficiently low to permit handling thereof without inconvenience.

Although considerable structural arrangements involving the invention have been shown and described in detail, it will be apparent to those skilled in the art that the invention is not so limited but that various changes can be made therein without departing from the spirit and/or scope of the invention as exemplified in the appended claims.

I claim:

1. In a glass bending apparatus, an elongate frame mold having upwardly facing perimetric edge portions of predetermined curvature along which the glass sheet, when heated, is adapted to be bent, said frame mold including an intermediate section and end sections, supporting means adjacent outer end portions of the end sections, supporting arms extending rigidly from outer ends of the end sections and being freely slidable horizontally on said supporting means, said intermediate and end sections being pivotally connected with each other in end to end relation and being pivotally extensible to receive and be held in extended position by a sheet of unbent glass mounted thereon, said frame mold tending to collapse under its own weight and the weight of the sheet glass being heated thereon, and stop means connected with the mold sections for limiting collapsing movement of said sections to the final shape of the glass to be bent.

2. In a glass bending apparatus, an elongate frame mold having upwardly facing perimetric edge portions of predetermined curvature along which the glass sheet, when heated, is adapted to be bent, said frame mold including an intermediate section and end sections, supporting means adjacent outer end portions of the end sections, and supporting arms extending rigidly from outer ends of the end sections and being freely slidable horizontally on said supporting means, said intermediate and end sections having pivotal connections with each other securing them in end to end relation and being pivotally extensible to receive and be held in extended position by a sheet of unbent glass mounted thereon, said frame mold tending to collapse under its own weight and the weight of the sheet glass thereon, said intermediate section having stop means on opposite end portions thereof, said arms having stop portions extending inwardly to a position adjacent said stop means and coacting therewith to limit hinging movement among said sections.

3. In a glass bending apparatus, an elongate frame mold having upwardly facing perimetric edge portions of predetermined curvature along which the glass sheet is adapted to be bent, said frame mold including an intermediate section and end sections, supporting means adjacent outer end portions of the end sections, and supporting arms extending rigidly from outer ends of the end sections and being freely slidable horizontally on said supporting means, said intermediate and end sections having hinge connections securing them in end to end relation and being pivotally extensible to receive in extended position a sheet of unbent glass thereon, said frame mold tending to collapse under its own weight and the weight of the sheet glass thereon, said intermediate section having stop means on opposite end portions thereof, said arms having stop portions extending inwardly to a position adjacent said intermediate section stop means and coacting therewith to limit hinging movement among said sections, said stop means and stop portions including adjustable means to vary the degree of hinging action among said sections.

4. In a glass bending structure, a mold frame comprising intermediate and end molding sections defining around the perimeter thereof an upwardly facing glass bending area, each end section being of approximately U-shape and having braces connected rigidly between the legs thereof, the upper edges of each section defining portions of curvatures to which the glass is to be bent, a cradle frame enclosing and extending lengthwise of said mold frame, supporting means rigidly attached to the outer end portions of said end sections for engagement with and lengthwise movement relative to said mold frame, said intermediate and end sections having hinge connections at opposite sides of the mold frame linking said sections together, the hinge connections at one side of the intermediate section and the hinge connections on the opposite side of the latter section being offset to alter the angular pivotal relation of the U-shaped sections to the center section as the mold moves from open to closed position.

5. Glass bending apparatus comprising, a supporting frame having a depending center section approximating the contour of a closed mold and laterally extending end sections, a glass bending mold including a center section and end sections, mold suspension means pivotally connected with each end of the mold center section and with the adjacent supporting frame end section, a mold end section rigidly connected with each suspension means for cooperating with the mold center section to define the contour of the bent glass when the mold is in closed position, an adjustable stop on each mold suspension means for engagement with the mold center section to limit relative movement between the means and center section in one direction, and glass stop members mounted on each mold end section for engagement with a flat sheet of glass placed upon the mold in open position.

6. In a glass bending apparatus, in combination, a mold supporting frame, a glass shaping mold which in closed position determines the contour of the bent glass and which is movable to open position to receive a flat glass sheet to be bent, a mold center section suspended for movement relative to the frame upon suspension means pivotally connected with each end of the center section and engaging the supporting frame for movement relative thereto and thereon, end mold sections mounted on the suspension means for movement therewith, and an adjustable stop means associated with the suspension means and mold center section adjacent each end thereof for aligning the end mold sections relative to the center mold sections when the mold is in closed position.

7. In a glass bending apparatus, in combination, a mold supporting frame, a sectional mold mounted on the frame between the end portions thereof for movement to open position for receiving a flat glass sheet and to closed position for bending the glass sheet to the desired contour, a center mold section having spaced connected side members of unequal length, a suspension member pivotally connected with each end of each mold section side member and slidably connected with the adjacent end portion of the frame, end mold sections rigidly connected with the suspension members at each end of the center mold section for movement relative to the center section, each end section having its axis of rotation relative to the center section angularly disposed relative to the axis of rotation of the suspension members relative to the frame end portion.

8. Glass bending apparatus comprising a supporting frame having end portions upon which a sectional mold is slidably connected, a mold center section having spaced glass shaping surfaces, a supporting arm pivotally connected to each side of each end of the center section and slidably engaging the adjacent supporting frame end section, mold end sections rigidly mounted on the adjacent supporting arms to form continuations of the glass shaping surfaces of the mold center section, and adjustable means on at least one of the supporting arms at each end of the center section for limiting relative movement between the center and adjacent end sections in mold closing position.

References Cited in the file of this patent

UNITED STATES PATENTS

| 1,999,558 | Black | Apr. 30, 1935 |
| 2,111,370 | Owen | Mar. 15, 1938 |
| 2,166,427 | Drake | July 18, 1939 |
| 2,213,405 | Paddock | Sept. 3, 1940 |
| 2,218,654 | Paddock | Oct. 22, 1940 |
| 2,261,023 | Galey | Oct. 28, 1941 |
| 2,270,470 | Paddock | Jan. 20, 1942 |
| 2,369,368 | Paddock et al. | Feb. 13, 1945 |
| 2,518,951 | Smith | Aug. 15, 1950 |
| 2,551,607 | Jendrisak | May 8, 1951 |